US005707907A

United States Patent [19]
Brown

[11] Patent Number: 5,707,907
[45] Date of Patent: Jan. 13, 1998

[54] HIGH LOADING, LOW VISCOSITY MEDIUM FOR CERAMIC COATING COMPOSITION

[75] Inventor: Terry Joseph Brown, Pittsburgh, Pa.

[73] Assignee: Cerdec Corporation, Washington, Pa.

[21] Appl. No.: 798,469

[22] Filed: Feb. 10, 1997

Related U.S. Application Data

[62] Division of Ser. No. 355,556, Dec. 14, 1994.

[51] Int. Cl.$^6$ .................... C03C 8/16; C03C 8/18
[52] U.S. Cl. .................... 501/20; 501/17; 501/19; 427/226; 427/375; 427/376.2; 427/384; 428/426; 428/428; 428/432
[58] Field of Search .................... 501/17, 19, 20; 427/226, 375, 376.2, 384; 428/426, 428, 432

[56] References Cited

U.S. PATENT DOCUMENTS

| | | |
|---|---|---|
| 4,029,605 | 6/1977 | Kosiorek .................... 252/514 |
| 4,098,949 | 7/1978 | Kosiorek .................... 428/434 |
| 4,369,063 | 1/1983 | McGowan, Jr. .................... 106/1.14 |
| 4,859,459 | 8/1989 | Greiche et al. .................... 424/71 |
| 4,892,847 | 1/1990 | Reinherz .................... 501/14 |
| 4,906,596 | 3/1990 | Joslin et al. .................... 501/17 |
| 4,959,090 | 9/1990 | Reinherz .................... 65/60.4 |
| 4,970,178 | 11/1990 | Klimas et al. .................... 501/26 |
| 4,970,220 | 11/1990 | Chaussee .................... 424/70 X |
| 5,041,285 | 8/1991 | Lundmark .................... 424/70 |
| 5,059,414 | 10/1991 | Dallal et al. .................... 424/70 |
| 5,102,654 | 4/1992 | Castrogiovanni et al. .................... 424/62 |
| 5,302,557 | 4/1994 | Carroll et al. .................... 501/19 |
| 5,346,651 | 9/1994 | Oprosky et al. .................... 252/514 |
| 5,350,528 | 9/1994 | Westland et al. .................... 252/8.551 |
| 5,456,745 | 10/1995 | Roreger et al. .................... 108/128 |
| 5,460,808 | 10/1995 | Mausner .................... 424/70.7 |

FOREIGN PATENT DOCUMENTS 2 531 260   1/1977   Germany .

*Primary Examiner*—Anthony Green
*Attorney, Agent, or Firm*—Wenderoth, Lind & Ponack

[57] ABSTRACT

An improved medium for use in preparing ceramic coating compositions. The improvement resides in the employment of pantothenol as a rheology modifier in the medium.

5 Claims, No Drawings

HIGH LOADING, LOW VISCOSITY MEDIUM FOR CERAMIC COATING COMPOSITION

This application is a divisional application of application Ser. No. 08/355,556, filed Dec. 14, 1994.

The present invention provides an improved medium (or vehicle) for ceramic coating compositions.

BACKGROUND OF THE INVENTION

Ceramic coating compositions which are particularly useful in providing decorative and functional coatings for glass, chinaware and the like are well known. These compositions in general take the form of squeegee pastes or roll coat paints and they must have specific properties in order to have a working product. Especially important is the viscosity of the medium or vehicle used in producing the composition. Also important is the solids loading capacity (powder to oil ratio) of the paste materials made with the medium. Additionally, the rheology or viscosity profile of the squeegee paste or the roll coat paste is an important factor.

In general, the ceramic coating compositions are composed of a glass frit, a vehicle or medium and, optionally, a pigment. Typically, the composition in the form of a paste is applied to a substrate such as automotive glass by silk screen or other application technique and the coated substrate is heated or fired to fuse the glass frit and to volatilize the vehicle or medium, thereby firmly bonding the coating to the surface of the substrate.

The vehicles or mediums which have previously been employed in the ceramic coating compositions are typically organic and include compositions based on pine oils, vegetable oils, mineral oils, low molecular weight petroleum fractions, tridecyl alcohol and the like. The vehicles may be modified by addition of viscous resins such as vinyl resins, solvents, film formers such as cellulosic materials, and the like.

There is a need in the art for paste ceramic coating compositions which have a high solids content. This results in products having lower volatile organic content (VOC). The need for lower products is particularly important in ceramic coating products which employ the lead-free glass frits since these products have a lower density.

DESCRIPTION OF THE INVENTION

The invention provides an improved medium or vehicle for use in forming ceramic coating compositions. The improvement of the invention comprises employing pantothenol (pantothenyl alcohol) as a rheology modifier in the medium or vehicle.

Pantothenol or pantothenyl alcohol is the compound 2,4-dihydroxy-N-(3-hydroxypropyl)-3,3-dimethylbutanamide. The compound exists as the (±) racemic mixture. The (+) and (−) enantiomers are also known and the D(+) form is known to have vitamin activity. The racemic mixture or the individual enantiomers may be used in the present invention; however, the racemic mixture is preferred for economic reasons.

In general, the medium of the invention comprises a solvent base in an amount of about 50 to 99% by weight, from 0 up to about 45% by weight of a binder, from about 0.1 to 50% by weight pantothenol, from 0 up to about 15% by weight of plasticizer and from 0 up to about 15% by weight of a viscosity modifier.

The solvent base for the medium may be one or a mixture of those materials which have been previously employed in the field of ceramic coating compositions. The materials are illustrated by pine oil, terpineol, ester alcohols, alcohols such as tridecyl alcohol, glycols, glycol ethers, aromatic hydrocarbons, isoparaffinic hydrocarbons and aliphatic hydrocarbons. Particularly suitable is tripropylene glycol methyl ether.

The medium optionally includes a binder in an amount up to about 45% by weight. Such binders are known in the art. As illustrative of such binders, there can be mentioned polystyrene and modified polystyrene, e.g., piccolastic resin; poly alpha-methylstyrene, e.g., Kristalex resin; partially hydrogenated resin, e.g., stabelite resin; esters of hydrogenated rosin, e.g., stabelite esters; acrylic resins such as homo- and co-polymers of methyl methacrylate, ethyl methacrylate, n-butyl methacrylate and isobutyl methacrylate.

Optionally, the medium includes up to about 15% by weight of a plasticizer. Such plasticizers are known in the art and are illustrated by dibutyl phthalate, dioctyl phthalate, tributyl phosphate, stearate compounds, methyl ester of rosin, e.g., Abayln, hydroabietyl alcohol, e.g., Abitol, hydrogenated methyl ester of rosin, e.g., Hercolyn-D and Amine-D.

As an additional optional component, the medium can contain up to about 15% by weight of a viscosity modifier. Such modifiers are also known in the art and are illustrated by ethyl cellulose, nitro cellulose, hydroxypropyl cellulose, hydroxypropyl methylcellulose, acrylic resins, poly(vinyl) butyral resins, carboxymethyl cellulose, and ethylhydroxyethylcellulose.

The medium may also contain further modifying components such as a dispersant and an odor mask as may be desired. Such materials are known in the art and any of the known materials can be employed so long as they are compatible with the other components of the medium.

The medium can be prepared by combining the necessary components and, if necessary, heating to bring all components into solution. To illustrate, to the solvent base there is added the pantothenyl alcohol and, optionally, the binder, plasticizer and viscosity modifier. The mixture is heated to about 150° to 200° F. until a uniform solution is formed. The solution is then cooled and additional optional components such as dispersant and odor mask are added with mixing to obtain a uniform solution.

The thus formed medium or vehicle can be used as the organic medium or vehicle for preparing a ceramic coating composition. By employing the medium of the invention, a coating composition can be produced which has a much higher solids loading, a higher density of the screen printed or roll coated film and a lower VOC as a direct result of the higher solids loading. Also, the resultant ceramic coating composition possesses better viscosity stability over time. The higher printed film density results in less light transmission and better opacity of the fired films.

The medium of the invention has a very low viscosity and enables the production of a ceramic coating composition which has excellent viscosity stability and which will not separate and settle out during storage.

The medium of the invention can be used in forming ceramic coating compositions of the type disclosed, for example, in U.S. Pat. Nos. 4,959,090, 4,970,178 and 4,892,847. These are, of course, purely illustrative and not exhaustive of compositions in which the medium of the invention can be employed.

The medium can also be employed in the formation of ceramic metallizing composition which are suitable for the production of fired on electrically conductive films. See, for example, U.S. Pat. Nos. 4,098,949, 4,369,063, 4,029,605 and 5,346,651.

The medium of the invention is particularly useful in the preparation of ceramic coating compositions in which the glass frit which is employed is a lead-free glass frit. Such compositions and the lead-free glass frits are well known.

In general, the ceramic coating compositions comprise the glass frit, the medium or vehicle and, optionally, a pigment. In the case of the metallizing compositions, there is also present the finely divided electrically conductive metal such as silver. Other components may be employed to adjust the properties of the composition as is known in the art. The improvement of the present invention resides in the employment of the medium of the present invention as the medium or vehicle in such compositions.

It is also to be noted that the medium of the invention can be provided independently as a separate product which can be used as a diluent for the ceramic coating compositions. Thus, the coating or printing properties of such coating compositions can be adjusted at the time of use by adding the desired amount of the medium to such composition.

In order to illustrate the invention, the following examples are presented. It is to be emphasized that these are purely illustrative and are not exhaustive of the invention.

EXAMPLE 1

To a container was added 35.192 parts by weight of tripropylene glycol methyl ether (Arcosolve TPM) and heating was initiated. DL Pantothenol Cosmetic Grade (2.736 parts by weight) and hydroxypropylcellulose (1.408 parts by weight Klucel E) were added to the container with mixing and heating was continued until the temperature of the mixture reached 175° F. The heating was discontinued when pantothenol and Klucel E went into solution. The mixture was allowed to cool for 40 minutes. At that time, 0.604 parts by weight of dispersant (Disperbyk 110 a saturated polyester with acidic groups) and 0.06 parts by weight of an odor mask (Fresh Linen 6503/2) were added with stirring. The resultant mixture was filtered through a 325 mesh screen to obtain the medium of the invention.

Klucel E is a tradename of Aqualon Company.

Arcosolve TPM is a tradename of ARCO Chemical Co.

Disperbyk 110 is a tradename of BYK Chemie, Additives Division.

Fresh Linen 6503/2 is a tradename of Givaudan-Roure.

EXAMPLE 2

A black ceramic coating composition was prepared employing the medium of Example 1. Black enamel powder containing glass frit and pigments was combined with the medium of Example 1 and mixed until homogeneous. After mixing, the resultant paste was milled using a three roll mill. The resultant paste has a solids content of 82 to 84 weight percent and the content of the medium is 16 to 18 weight percent.

Black enamel powder composition 75.75 wt % glass frit (1)

15.15 wt % black pigment No. 1 (2)

9.11 wt % black pigment No. 2 (3)

(1) Frit Composition

PbO 61.09 wt %

$SiO_2$ 29.23 wt %

$Na_2O:B_2O_3$ 5.62 wt %

$ZrO_2:SiO_2$ 1.92 wt %

$Na_2CO_3$ 1.13 wt %

(2) Black pigment No. 1—Cr, Cu Oxide spinel (3) Black pigment No. 2—Ni, Mn, Fe, Cr Oxide spinel

EXAMPLE 3

The black ceramic coating composition of Example 2 was applied by screen printing to appliance glass. Very sharp print detail was observed. The glass with the applied coating was fired in a conventional manner at a temperature of 1200° to 1250° F. for from four to six minutes to obtain a coated appliance glass product with sharp print detail.

The black ceramic coating composition can also be employed in the coating of automotive glass such as windshields and backlights.

What is claimed is:

1. In a ceramic coating composition comprising a glass frit and an organic medium, the improvement wherein the organic medium is a medium comprising a solvent base of tripropylene glycol methyl ether in an amount of about 50% to 99% by weight and about 0.1 to 50% by weight pantothenol.

2. A composition according to claim 1 further containing a pigment.

3. A composition according to claim 1 further containing a finely divided electrically conductive metal.

4. A method for the preparation of a glass substrate coated with a ceramic coating composition which comprises applying to at least a portion of a glass substrate a ceramic coating composition as defined in claim 1 and subsequently firing said coated substrate to fuse said coating to said substrate.

5. A coated glass substrate produced in accordance with the process of claim 4.

* * * * *